L. KREFT.
VERMIN DESTROYING APPARATUS.
APPLICATION FILED APR. 1, 1909.
943,256.
Patented Dec. 14, 1909.
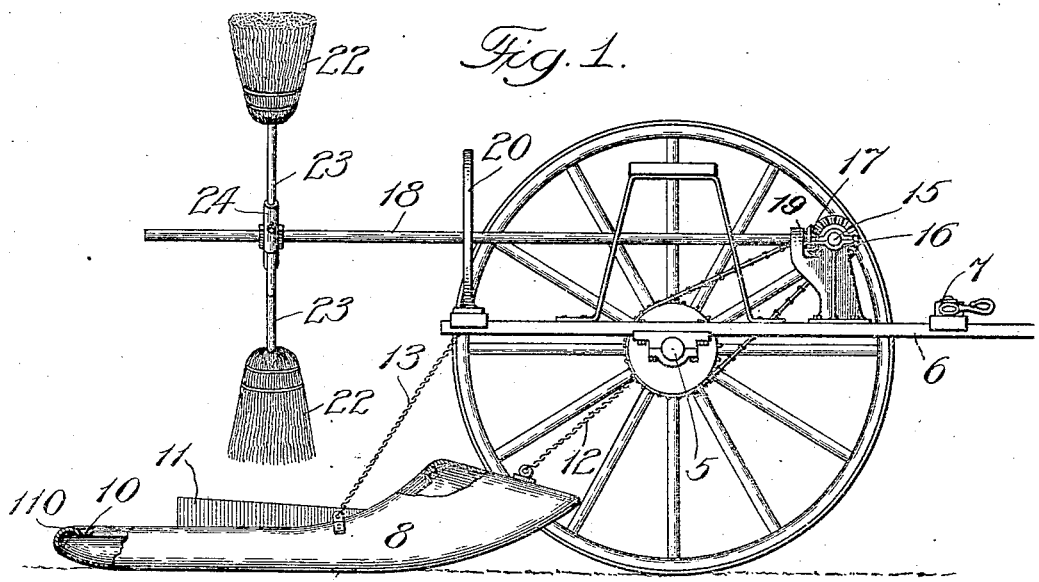
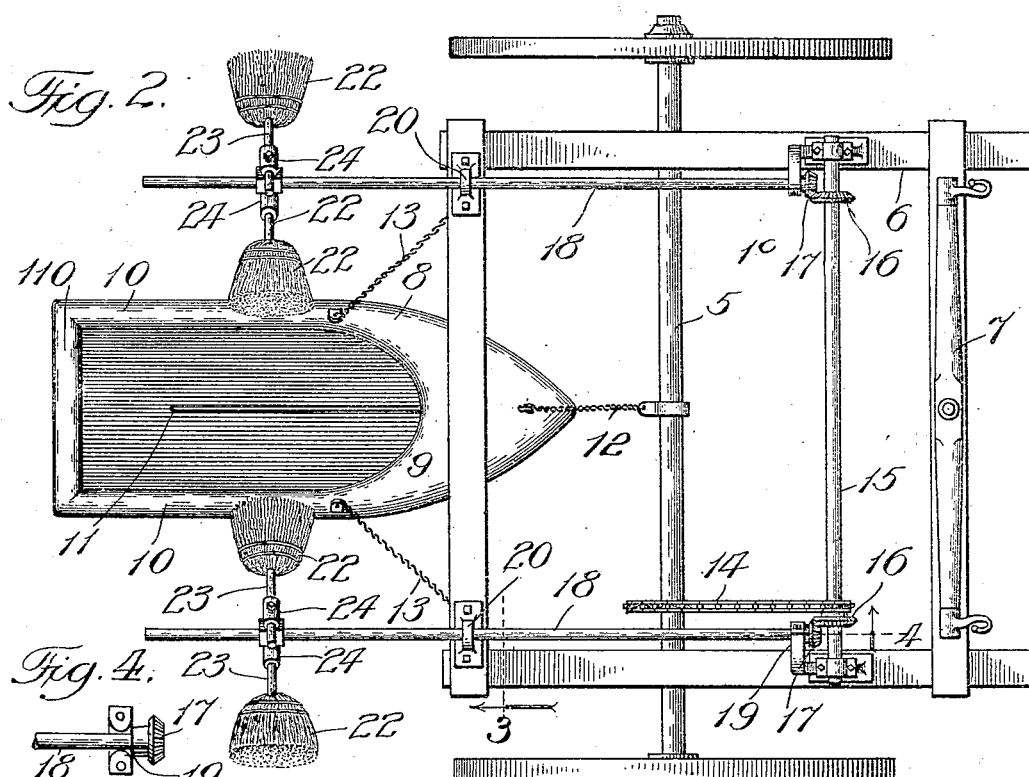
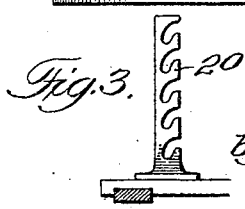
Witnesses:
John Enders.
Chas. H. Buell.
Inventor:
Louis Kreft.
by Dyrenforth, Lee, Chritton & Wiles
Attorney

UNITED STATES PATENT OFFICE.

LOUIS KREFT, OF DES PLAINES, ILLINOIS.

VERMIN-DESTROYING APPARATUS.

943,256.  Specification of Letters Patent.  Patented Dec. 14, 1909.

Application filed April 1, 1909. Serial No. 487,289.

*To all whom it may concern:*

Be it known that I, LOUIS KREFT, a citizen of the United States, residing at Des Plaines, in the county of Cook and State of Illinois, have invented a new and useful Improvement in Vermin-Destroying Apparatus, of which the following is a specification.

My invention relates to an improvement in apparatus for brushing vermin from vines; and I have more especially devised it for removing potato-bugs from potato-vines, and illustrate it in the form particularly adapting it for that purpose in the accompanying drawings, in which—

Figure 1 shows my improved apparatus by a view in side elevation, with the vehicle-shafts broken away; Fig. 2 is a plan view of the same, Fig. 3, a section on line 3, Fig. 2, and Fig. 4, a broken section on line 4, Fig. 2.

The vine-brushing means and receptacle for the bugs brushed from the vines are supported on a wheeled vehicle shown in its preferred sulky-like form involving an axle 5 carrying a rectangular frame 6, the sides of which form shafts for the draft-animal harnessed to a whiffle-tree 7 on the forward member of the frame.

The receptacle 8 is shown of peculiar shape and construction for best adapting it for its purpose. It is preferably made of metal with a flat base of general rectangular form terminating in an upwardly inclined laterally tapering forward end provided with an integral cover 9 rolled or curved inwardly about its inner edge where it merges into the upper edges 10, 10 along the sides, which are also curved or rolled inwardly; and the end of the receptacle is provided with a similar rolled upper edge 11⁰ extending between the side-edges.

An important feature of the receptacle is a stop-partition 11 rising vertically from the base of the receptacle to extend centrally and longitudinally thereof short of its rear end and upward beyond the receptacle-sides. The rolled edges and partition are provided for the purposes hereinafter explained.

The receptacle 8 is dragged by the vehicle and to that end a chain 12, or the like, connects its forward end with the axle 5 at the center thereof, and similar means 13, 13 connect it at opposite sides near the forward ends of the side-edges with the rear member of the frame 6 near the ends of said member. By employing chains as the connecting medium between the receptacle and vehicle, they not only afford a flexible connection between these parts, but permit of the adjustment of the receptacle relative to the vehicle.

The axle has a drive-chain connection 14 with a shaft 15 journaled at its ends on the side members of the frame toward its forward end, this shaft carrying near its ends similar miter-gears 16 meshing with similar pinions 17 on the forward ends of rotary broom-shafts 18, 18. Each broom-shaft is journaled in a bearing 19 extending from a frame-side, the bearing being provided with a curved surface adjacent to the shaft, as represented in Fig. 4, affording a one-point bearing for the latter, to permit it to have a free or universal movement therein as it is adjusted in the rack for the purpose hereinafter explained by raising and lowering it toward its free broom-carrying rear end. Rising from the rear frame-member in the path of each broom-shaft is a rack 20 containing a vertical series of notches 21 forming seats for the shaft at different elevations. The members of a pair of brushing-brooms 22 radiate from each shaft 18 near its rear end over the receptacle 8, being adjustably and removably fastened at their handles 23 to sockets 24 on the shaft.

With the parts occupying the relative positions illustrated, by riding the vehicle along a row of potato-vines and dragging the boat or receptacle 8 after it, the gearing of the shafts 18 turns them rapidly to rotate the brooms 22 in the directions to sweep inwardly across the vines and brush bugs upon them into the receptacle. By raising or lowering the broom-shafts they may be adjusted as to their seats in the racks 20 with reference to the heights of the vines to be brushed. The action of the brooms is so forcible as to tend to sweep the bugs across and thus beyond the receptacle 8; but this is prevented by the interposition in their paths of the partition 11, which stops the bugs and deflects them into the receptacle, wherein they are confined, being prevented from crawling out of it by its rolled edges.

What I claim as new and desire to secure by Letters Patent is—

1. In a vermin-destroying apparatus, the combination with a wheeled vehicle, of a shaft mounted on the frame parallel with and geared to the axle, broom-shafts adjustably journaled on the frame and geared at their forward ends to said first-named shaft to be rotated by movement of the vehicle, sockets adjustably mounted on said broom-shafts and adapted to be adjusted lengthwise thereon, brooms extending from said broom-shafts and adjustably secured in said sockets, and a partition-equipped vermin-receptacle flexibly connected with the vehicle to be dragged by its movement and extending behind it in the plane between the broom-shafts, for the purpose set forth.

2. In a vermin-destroying apparatus, the combination with a wheeled vehicle, of a shaft mounted on the frame parallel with and geared to the axle, broom-shafts adjustably journaled on the frame and geared at their forward ends to said first-named shaft to be rotated by movement of the vehicle, sockets adjustably mounted on said broom-shafts and adapted to be adjusted lengthwise thereon, brooms extending from said broom-shafts and adjustably secured in said sockets, a partition-equipped vermin-receptacle, and chains connecting said receptacle with said vehicle, for the purpose set forth.

3. In a vermin-destroying apparatus, the combination with a wheeled vehicle having an axle and provided with a frame mounted thereon, of a shaft mounted on the frame parallel with and geared to said axle, broom-shafts adjustably journaled on the frame and geared at their forward ends to said first-named shaft to be rotated by movement of the vehicle, sockets adjustably mounted on said broom-shafts and adapted to be adjusted lengthwise thereon, brooms extending from said broom-shafts and adjustably secured in said sockets, a partition-equipped vermin-receptacle, a chain secured to said receptacle near its front end and to the axle, and chains secured to the opposite sides of said receptacle between its ends and to said frame, whereby said receptacle can be adjusted lengthwise of the vehicle by lengthening or shortening said chains and whereby said receptacle may be dragged behind the vehicle by its movement, for the purpose set forth.

LOUIS KREFT.

In presence of—
WM. H. AHRENSFELD,
H. WAGNER.